(12) United States Patent
Shang et al.

(10) Patent No.: US 11,307,936 B2
(45) Date of Patent: Apr. 19, 2022

(54) SOLID-STATE DRIVE DATA SECURITY

(71) Applicant: SHENZHEN DAPU MICROELECTRONICS CO., LTD., Shenzhen (CN)

(72) Inventors: Ning Shang, Shenzhen (CN); Xiang Chen, Shenzhen (CN)

(73) Assignee: SHENZHEN DAPU MICROELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 16/851,809

(22) Filed: Apr. 17, 2020

(65) Prior Publication Data

US 2020/0241970 A1   Jul. 30, 2020

Related U.S. Application Data

(63) Continuation of application No. PCT/CN2018/121058, filed on Dec. 14, 2018.

(30) Foreign Application Priority Data

Jan. 12, 2018   (CN) .......................... 201810031377.1

(51) Int. Cl.
*G06F 3/06* (2006.01)
*G06F 11/14* (2006.01)
(Continued)

(52) U.S. Cl.
CPC ........ *G06F 11/1451* (2013.01); *G06F 3/0619* (2013.01); *G06F 3/0652* (2013.01);
(Continued)

(58) Field of Classification Search
CPC .. G06F 11/1451; G06F 3/0619; G06F 3/0652; G06F 3/0679; G06F 3/065
(Continued)

(56) References Cited

U.S. PATENT DOCUMENTS

2014/0052892 A1   2/2014  Klein et al.
2019/0278482 A1*  9/2019  Dubeyko .............. G06F 3/0643
(Continued)

FOREIGN PATENT DOCUMENTS

CN         1661573 A       8/2005
CN       101499028 A       8/2009
(Continued)

OTHER PUBLICATIONS

CN105893178, Suzhou, Machine Translation. Aug. 24, 2016 (Year: 2016).*

(Continued)

*Primary Examiner* — Than Nguyen

(74) *Attorney, Agent, or Firm* — Bayes PLLC

(57) ABSTRACT

The present disclosure discloses a method, a system, and a solid-state drive for data processing. The method includes detecting the user operations on a first storage area which is visible to an operating system in a solid-state drive; if the user operation is a reading or writing operation, keeping the data of the first storage area and the data of a mirrored data storage area of a second storage area to be synchronization; if the user operation is a deleting operation or a TRIM operation, keeping the data of the first storage area and the data of the mirrored data storage area of the second storage area to be synchronization, and backing up the deleted data from the first storage area to a deleted data storage area of the second storage area. The second storage area is set to be invisible to the operating system in the solid-state disk.

20 Claims, 4 Drawing Sheets

(51) Int. Cl.
*G06F 11/07* (2006.01)
*G06F 11/10* (2006.01)
*G06F 11/20* (2006.01)
*G06F 11/30* (2006.01)

(52) U.S. Cl.
CPC ........ *G06F 3/0679* (2013.01); *G06F 11/0772* (2013.01); *G06F 11/0787* (2013.01); *G06F 11/1068* (2013.01); *G06F 11/1469* (2013.01); *G06F 11/2056* (2013.01); *G06F 11/3034* (2013.01)

(58) Field of Classification Search
USPC .................................................. 711/103, 162
See application file for complete search history.

(56) References Cited

U.S. PATENT DOCUMENTS

| | | | | |
|---|---|---|---|---|
| 2020/0042194 | A1* | 2/2020 | Hashimoto | G06F 11/3485 |
| 2020/0104063 | A1* | 4/2020 | Wu | G11C 14/0063 |

FOREIGN PATENT DOCUMENTS

| | | |
|---|---|---|
| CN | 101777013 A | 7/2010 |
| CN | 102511044 A | 6/2012 |
| CN | 102591748 A | 7/2012 |
| CN | 103942126 A | 7/2014 |
| CN | 104216796 A | 12/2014 |
| CN | 105653402 A | 6/2016 |
| CN | 105893178 A | 8/2016 |
| CN | 106294007 A | 1/2017 |
| CN | 108170562 A | 6/2018 |

OTHER PUBLICATIONS

CN103942126, Lenovo, Machine Translation. Jul. 23, 2014 (Year: 2016).*
International Search Report and Written Opinion issued in corresponding International Application No. PCT/CN2018/121058 with English translation, dated Mar. 13, 2019, 10 pages.

\* cited by examiner

SOLID-STATE DRIVE DATA SECURITY

CROSS-REFERENCE TO RELATED APPLICATIONS

The present application is a continuation of International Application No. PCT/CN2018/121058, filed on Dec. 14, 2018, which claims priority to Chinese Patent Application No. 201810031377.1, filed on Jan. 12, 2018. The entire contents of both applications are incorporated herein by reference.

TECHNICAL FIELD

The present disclosure relates to the field of solid-state drive, and more particularly to method, system, and solid-state drive for data processing.

BACKGROUND

At present, the solid-state drives (SSD) on the market mainly provide storage functions for data reading and writing, and they do not provide the backup and recovery functions for the deleting data. The backup and recovery functions of SSD data mainly depends on the management and maintenance by the upper operating system layer, the application layer, or the storage system layer. Although the upper management schemes can meet the requirements of the data backup and recovery under normal circumstances, they can not provide effective detection and data recovery in the case that the data was deleted because of malevolence or wrong operation by the privileged system users who can modify or disable the upper management schemes. In addition, due to the garbage collection algorithm and TRIM deletion mechanism of the SSD, the retention time of the data deleted by the operating system is unpredictable. The traditional data forensics and recovery technology applied to the mechanical hard disk will face an unprecedented challenge when it is applied to solid-state drives.

SUMMARY OF THE DISCLOSURE

The present disclosure relates to a method, system, and solid-state drive for data processing that can backup data and also recover the deleted data.

In order to solve the above problems, one aspect of the present disclosure provides a method for data processing in the solid-state drive. The method includes detecting the user operations on a first storage area, which is visible to an operating system in the solid-state drive; if the user operation is a reading or writing operation, keeping the data of the first storage area and the data of a mirrored data storage area of a second storage area synchronized; and if the user operation is a deleting operation or a TRIM operation, keeping the data of the first storage area and the data of the mirrored data storage area of the second storage area synchronized, and backing up the deleted data from the first storage area to a deleted data storage area of the second storage area. The second storage area can be set to be invisible to the operating system in the solid-state disk.

In some embodiments, after the step of detecting the user operations on the first storage area which is visible to the operating system in the solid-state drive, the method further includes when the operation on the first storage area is an abnormal operation, stopping the data synchronization between the first storage area and the mirrored data storage area, and then recording the abnormal operation event.

In some embodiments, after the step of backing up the deleted data from the first storage area to the deleted data storage area of the second storage area, the method further includes adding an information identifier to the deleted data from the first storage area.

In some embodiments, after the step of backing up the deleted data from the first storage area to the deleted data storage area of the second storage area, the method further includes processing the newly deleted data according to a preset storage rule when the storage medium space of the second storage area is detected to be less than or equal to a preset space.

In some embodiments, the method further includes verifying a visible authentication command; if and only if the verification is successful, setting the second storage area, which is not visible to the operating system, to be visible to the operating system; and enabling a first type of operating functions to the second storage area at the same time. The first type of operating functions includes restoring the data of the deleted data storage area to a storage medium, and reading the data of the second storage area.

In some embodiments, the method further includes verifying a function enable authentication command that sent by the user; if and only if the verification is successful, enabling a second type of operation function for the second storage area corresponding to the function enable authentication command; and if the validation is failed, disabling the operation corresponding to the function enable authentication command and returning an error code.

In some embodiments, the second type of operating functions includes resetting the second storage area to be invisible to the operating system; erasing the data in the second storage area; writing data to the second storage area; and reading specific information from the second storage area.

Another aspect of the present disclosure provides a system for data processing in a solid-state drive. The system includes an operation detection module configured to detect the user operations on a first storage area, which is visible to an operating system in the solid-state drive; a data synchronization module configured to keep the data of the first storage area and the data of the mirrored data storage area of the second storage area synchronized when the operation detection module detects that the operation is a reading or writing operation; and a storage module for deleted data configured to keep the data of the first storage area and the data of the mirrored data storage area of the second storage area synchronized, and back up the deleted data from the first storage area to the deleted data storage area of the second storage area when the operation detection module detects that the user operation is a deleting operation or the TRIM operation.

In some embodiments, the system further includes a synchronization stopping module configured to stop the data synchronization between the first storage area and the mirrored data storage area, and record the abnormal operation event when the operation detection module detects that the operation on the first storage area is an abnormal operation.

In some embodiments, the system further includes an identifier adding module configured to add an information identifier to the data deleted from the first storage area.

In some embodiments, the system further includes a visibility setting module configured to verify a visible authentication command sent by the user; if and only if the verification is successful, set the second storage area, which is not visible to the operating system, to be visible to the operating system, and enable the first type of operating functions to the second storage area at the same time. In some embodiments, the first type of operating functions includes restoring the data of the deleted data storage area to a storage medium; and reading data of the second storage area.

In some embodiments, the system further includes a functional enable module configured to verify the function enable authentication command sent by the user; if and only if the verification is successful, enable the second type of operation functions of second storage area corresponding to the function enable authentication command; and if the verification is failed, refuse the operation corresponding to the function enable authentication command and return an error code.

In some embodiments, the second type of operating functions include resetting the second storage area to be invisible to the operating system; erasing the data in the second storage area; writing data to the second storage area; and reading the specific information from the second storage area.

In some embodiments, the system further includes a volume detection module configured to detect the storage volume of the second storage area. The storage module for deleted data is also configured to process the new deleted data according to a preset storage rule when the storage volume of the second storage area is detected to be less than or equal to a preset volume.

Still another aspect of the present disclosure provides a solid-state drive. The solid-state drive includes a first storage area, which is visible to the operating system in the solid-state drive; a second storage area, which is set to be invisible to the operating system; and a Flash controller configured to execute the following program modules: an operation detection module configured to detect the user operations on the first storage area; a data synchronization module configured to keep the data of the first storage area and the data of the mirrored data storage area of the second storage area synchronized when the operation detection module detects that the operation is a reading or writing operation; and a storage module for deleted data configured to keep the data of the first storage area and the data of the mirrored data storage area of the second storage area synchronized, and back up the deleted data from the first storage area to the deleted data storage area of the second storage area when the operation detection module detects that the user operation is a deleting operation or a TRIM operation.

Compared with known solutions, the first storage area in the present disclosure is visible to the operating system, the second storage area is invisible to the operating system, and the second storage area is used to synchronize the first storage area data and the deleted data stored in the first storage area. The data processing method provided by the present disclosure synchronizes data written in the first storage area to the mirrored data storage area of the second storage area when performing reading and writing operations in the first storage area. When the user operation of the first storage area is detected to be a deletion operation or a TRIM operation, the deleted data is saved into the deleted data storage area of the second storage area, thereby avoiding the problem that the deleted data cannot be recovered caused by malicious Flash data or erroneous operation. And the Flash controller can be used to achieve data backing up and recovering in the SSD.

BRIEF DESCRIPTION OF THE DRAWINGS

In order to more clearly illustrate the embodiments of the present application, the drawings to be used in the embodiments will be briefly described below. It is apparent that the drawings in the following description are only some of the embodiments described in the present application.

DETAILED DESCRIPTION

The embodiments of the present disclosure will be clearly and completely described below in conjunction with the accompanying drawings in the present disclosure. It is apparent that the described embodiments are only a part of the embodiments of the present disclosure and not all of the embodiments.

Figure 4:
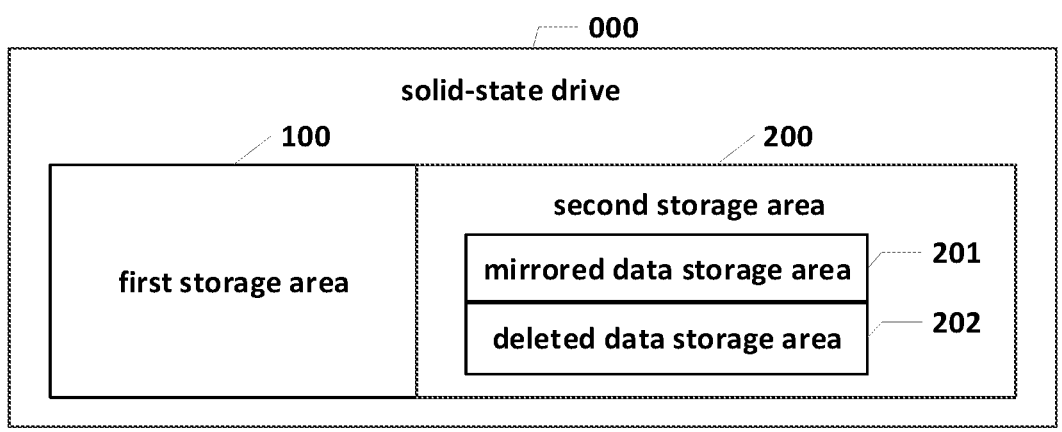
FIG. 4 is a structural block diagram of an embodiment of a solid-state disk provided by an embodiment of the present disclosure.

The structure of the solid-state drive in this application embodiment includes a Flash controller and a storage unit. As shown in FIG. 4, the embodiment of the present application creates a first storage area 100 that is visible to the operating system and a second storage area 200 that can be set to be invisible to the operating system on a storage unit in an SSD 000. The second storage area 200 includes a mirrored data storage area 201 and a deleted data storage area 202, and their logical isolation can be achieved through algorithms by the SSD Flash controller, for example, by the Flash Translation Layer (FTL). The first storage area 100, the mirrored data storage area 201, and the deleted data storage area 202 are all logical areas. In some implementations, the first storage area 100, the mirrored data storage area 201, and the deleted data storage area 202 may be physically separated Flash chips or different namespaces.

The first storage area 100 is visible to the operating system, and the first category of users (such as ordinary users) can manage the data of the first storage area 100 through the operating system, including the data reading, writing, deleting, or formatting. The second storage area 200 is managed by the authorized second category of users (such as an administrator) and is not visible to the operating system by default. The authorized second category of users can manage the data of the second storage area 200 through the operating system, can set the second storage area, which is not visible to the operating system by default, to be visible to the operating system, and can set the second storage area, which is visible to the operating system, to be invisible to the operating system. The data processing method of the solid-state disk provided by the embodiments of the present disclosure may be executed by the Flash controller of the solid-state disk.

Figure 1:
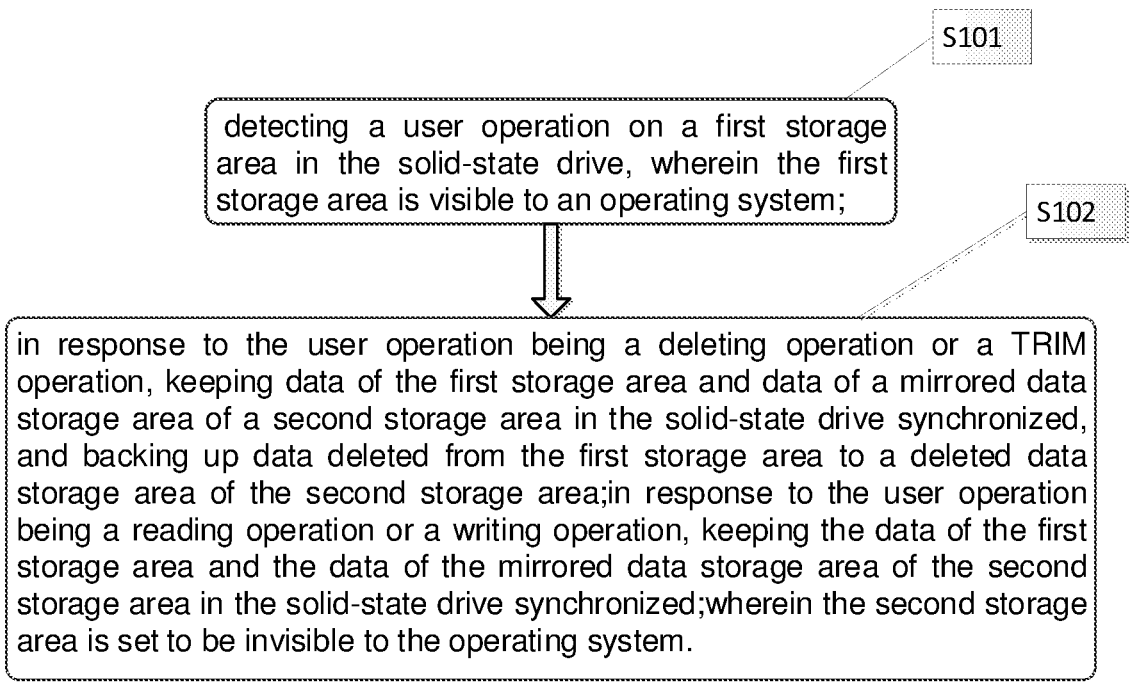
FIG. 1 is a method flow chart of an embodiment of a data processing method for a solid-state disk provided in the specific embodiment of the present disclosure.

The following is a further detailed description of the data processing method of a solid-state disk provided for the embodiments of the present disclosure in combination with FIG. 1. FIG. 1 is the method flow chart of an embodiment of a data processing method for a solid-state disk provided in the specific embodiment of the present disclosure. As shown in FIG. 1, the method in this embodiment includes:

Step S101: detecting the user operations on a first storage area which is visible to an operating system on a solid-state drive; and Step S102: if the user operation is a reading or writing operation, keeping the data of the first storage area and the data of a mirrored data storage area of a second storage area synchronized; and if the user operation is a deleting operation or a TRIM operation, keeping the data of the first storage area and the data of the mirrored data storage area of the second storage area synchronized, and backing up the deleted data from the first storage area to a deleted data storage area of the second storage area. The second storage area can be set to be invisible to the operating system in the solid-state disk.

This embodiment detects the user's operation in the first storage area. If the operation is a reading or writing operation, the method includes keeping the data of the first storage area and the data of a mirrored data storage area of a second storage area synchronized, which can back up the data. And if the operation is a deleting operation or a TRIM operation, the method includes keeping the data of the first storage area and the data of the mirrored data storage area of the second storage area synchronized, and backing up the deleted data from the first storage area to a deleted data storage area of the second storage area, thereby avoiding the situation that the deleted data cannot be recovered caused by malicious Flash data or erroneous operations.

In some embodiments, after the step of backing up the deleted data from the first storage area to the deleted data storage area of the second storage area, the method further includes adding an information identifier to the deleted data from the first storage area. When the data in the first storage area is deleted, the Flash controller backs up the deleted data to the deleted data storage area and adds an information identifier to the deleted data, which can facilitate the second user to restore the deleted data. In some embodiments, information identifiers can be added to the deleted data by using timestamps or other information that is useful for data recovery.

Figure 2:
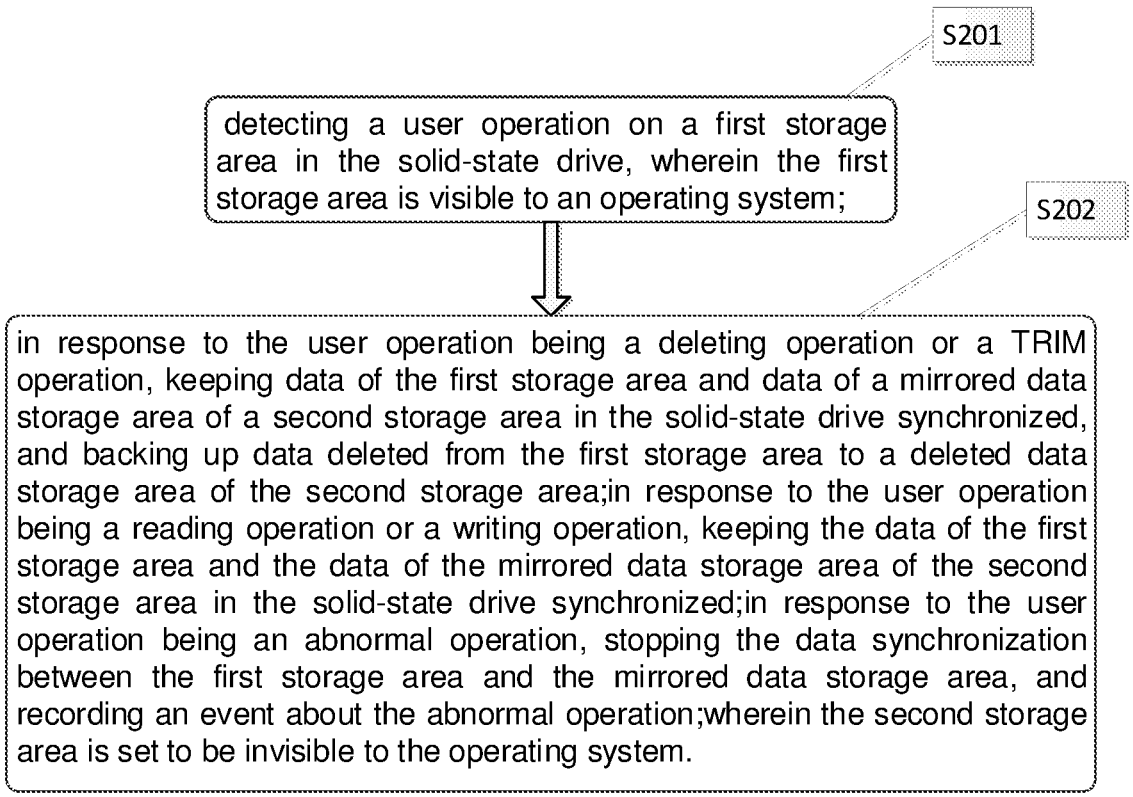
FIG. 2 is a method flow chart of another embodiment of a data processing method for a solid-state disk provided in the specific embodiment of the present disclosure.

FIG. 2 is a method flow chart of another embodiment of a data processing method for a solid-state disk provided in the specific embodiment of the present disclosure. As shown in FIG. 2, in some embodiments, the data processing method of the SSD includes: Step 201: detecting the user operations on a first storage area, which is visible to an operating system in the solid-state drive; and Step 202: if the user operation is a reading or writing operation, keeping the data of the first storage area and the data of a mirrored data storage area of a second storage area synchronized; and if the user operation is a deleting operation or a TRIM operation, keeping the data of the first storage area and the data of the mirrored data storage area of the second storage area synchronized, and backing up the deleted data from the first storage area to a deleted data storage area of the second storage area; and when the operation on the first storage area is an abnormal operation, stopping the data synchronization between the first storage area and the mirrored data storage area, and recording the abnormal operation event. The second storage area can be set to be invisible to the operating system in the solid-state disk.

In this embodiment, the SSD data processing method also includes the step of detecting whether the user's operation on the first storage area is abnormal. When the operation on the first storage area is an abnormal operation, the SSD data processing method further includes the steps of stopping the data synchronization between the first storage area and the mirrored data storage area, and recording the abnormal operation event, thereby preventing data loss caused by the abnormal operation, such as formatting the file system.

In some embodiments, after the step of backing up the deleted data from the first storage area to a deleted data storage area of the second storage area, the method further includes processing the newly deleted data according to a preset storage rule when the storage volume of the second storage area is less than or equal to a preset volume. In the case that the storage volume of the deleted data storage area is insufficient, the Flash controller can decide how to handle the newly deleted data through the preset storage rules. In the case that the storage volume of the deleted data storage area is insufficient, the Flash memory controller can decide whether to save or to ignore the newly deleted data through the preset storage rules. When the storage volume in the deleted data storage area is insufficient, the preset storage rules can include directly overwriting the oldest deleted data for the newly deleted data, stopping writing data to the deleted data storage area, i.e., ignoring the newly deleted data, and so on.

In some embodiments, the SSD data processing method also includes the steps of verifying a visible authentication command sent by the user; if and only if the verification is successful, setting the second storage area, which is not visible to the operating system, to be visible to the operating system; and enabling a first type of operating functions, such as restoring the deleted data to a storage medium, for the second storage area; and reading the data of the second storage area. the SSD data processing method also includes if and only if the user sends a visible authentication command and the validation is successful, setting the second storage area to be visible to the operating system. After the second storage area is visible to the operating system, the user can restore the data in the deleted data storage area to the storage medium or read the information in the second storage area through the regular read command. The storage medium can be the first storage area, other hard disks, floppy disks, optical disks, and so on. It is noted that there may not be a logical relationship between the step in this embodiment and the steps of S101 and S102.

In some embodiments, the SSD data processing method also includes the steps of verifying a functional enable authentication command; if and only if the verification is successful, enabling a second type of operation functions for the second storage area corresponding to the function enable authentication command; and if the verification is failed, disabling the operation corresponding to the function enable authentication command and returning an error code. The second type of operating functions includes resetting the second storage area to be invisible to the operating system, erasing the data in the second storage area, writing data to the second storage area, and reading specific information of the second storage area. The specific information can be an event log that includes timestamps or other information that is useful for data recovery. The SSD data processing method also includes if and only if the user sends a function enable authentication command and the verification is successful, enabling a second type of operation functions of the second storage area corresponding to the function enable authentication command. For example, the second category of users can hide the second storage area again, which is visible to the operating system after the verification, thereby better meeting the users' needs. The SSD data processing method also includes if the verification is failed, disabling the operation corresponding to the function enable authentication command and returning an error code. It is noted that there may not be a logical relationship between the step in this embodiment and the steps of S101 and S102.

In some embodiments, the Flash controller receives the authentication commands sent by the second category of users (including setting the visible authentication command and the function open authentication command), and verifying the authentication commands sent by the second category of users include steps A1 and A2 as follows:

Step A1: the Flash controller receives an authentication command sent by the second category of users, and the authentication command was generated by digitally signing a custom command with a private key.

The second type of user operates on the second storage area through the authentication command and has the private key used to generate the digital signature of the authentication command. The custom command is digitally signed to generate the authentication command online or offline. After the authentication command is generated, the second category of users sends the authentication command to the SSD.

In some embodiments, the authentication command is a custom command that has been digitally signed and is supported by the Flash controller. The custom command includes enabling the second storage area, which is not visible to the operating system, to be visible to the operating system; resetting the second storage area to be invisible to the operating system; erasing the data in the second storage area; and reading specific information of the second storage area. In some embodiments, the specific information can be an event log that includes timestamps or other information that is useful for data recovery.

Step A2: After the validity of the digital signature of the authentication command is successfully verified by the public key, the corresponding operation function of the custom command in the authentication command is enabled. In some embodiments, the public key is stored in the Flash controller to verify the digital signature of the authentication command.

The public key used to verify the digital signature of the authentication command is stored in the Flash controller, and the Flash controller receives the authentication command sent by the second category of users. After the validity of the digital signature of the authentication command is successfully verified by the public key, the corresponding operation function of the custom command in the authentication command is enabled. As a result, the second type of user can operate on the second storage area.

It should be noted that any digital signature algorithm based on public-key cryptography or any message authentication code algorithm based on the private key can be used to verify the generation and verification of commands A method for generating authenticatable commands, which also implements the function of generating different key pairs for different SSD devices, is described below in detail.

The manufacturer of SSD selects a key export function KDF (key, context) offline. The KDF function includes two parameters (1) key: the root key of the KDF function, and (2) context: the context personalization information related to the exported key, and generates an export key. The SSD manufacturer also selects a secret root key k for KDF and a digital signature algorithm based on an elliptic curve, such as Ed25519. It is understood that although Ed25519 is used as an example in the following description, any other suitable elliptic curve algorithm, public key digital signature algorithm, and private key-based message authentication code may be used to verify the generation of the authentication command.

For example, the key pair generation method for an SSD with a unique identifier of "guid" can be represented as sk=KDF(k,guid), where sk is the private key.

When selling SSDs, the second category of users receives the private key for the SSD from the vendor. The public key "pk" is generated based on the private key sk by calling the crypto_sign_keypair function of the NaCl library function. The public key is embedded in the memory cell of the Flash controller during the SSD production.

The category type of users having the private key sk generates the digital signature of the custom command by calling the crypto_sign function in the NaCl function library to act on the corresponding custom command containing the SSD unique identifier information and the private key sk. The second category of users adds a digital signature to the custom command to form a new string, which is an authentication command After receiving the authentication command, the Flash controller first checks whether the command is in the correct format and whether the unique identifier information contained in the command matches the unique identifier of the present SSD. Then the public key pk is used to verify whether the digital signature contained in the command is successfully passed. The Flash controller will not enable the functionality in the custom command until and only after all the checks have passed. In addition, the Flash controller can choose to log all or part of the events related to the processing of the authentication command and store them in a second storage area.

In summary, this embodiment uses a Flash controller to construct a first storage area and a second storage area in an SSD. The first storage area is visible to the operating system, and the second storage area is invisible to the operating system by default. The users can read, write, delete, or format in the first storage area. When the user writes data to the first storage area, the Flash controller synchronizes the data of the first storage area to the second storage area. When the user deletes or formats the data in the first storage area, the Flash controller stores the deleted data from the first storage area into the second storage area. Only after the authentication command sent by the user being verified, the Flash controller enables the operation function of the second storage area according to the authentication command. The method provided by the present disclosure can avoid the problem that the deleted data cannot be recovered caused by malicious Flash data or erroneous operations, and use the Flash controller to realize data backup and recovery of the data in the SSD.

Figure 3:
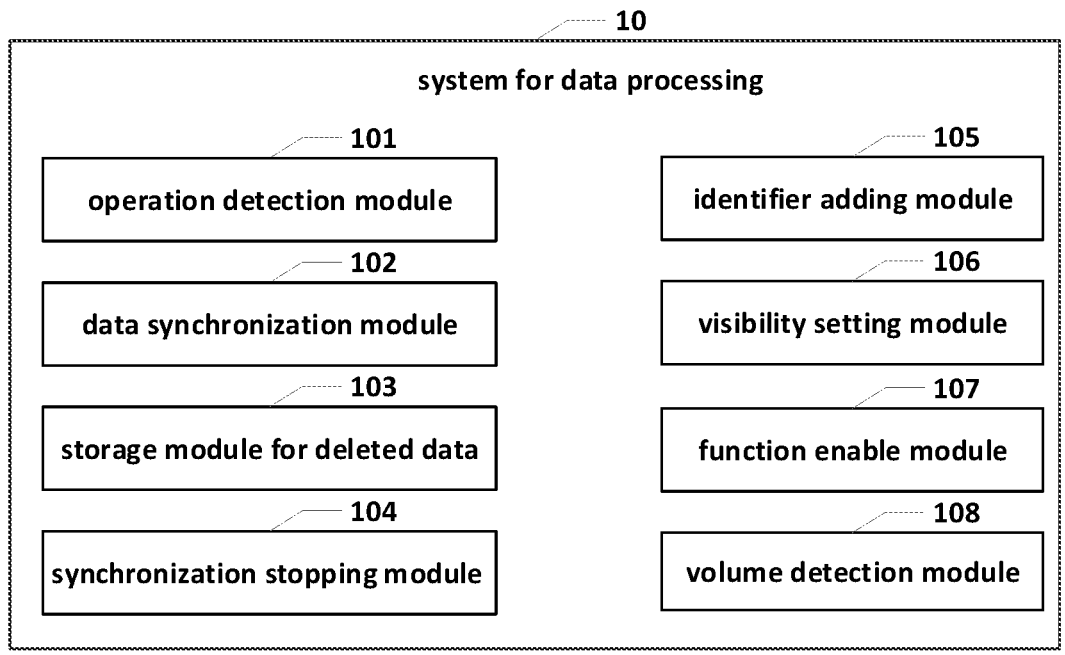
FIG. 3 is a structural block diagram of an embodiment of a data processing system for a solid-state disk provided in the specific embodiment of the present disclosure.

The following is a further detailed description of a data processing system for a solid-state drive provided with the embodiment of the present disclosure in conjunction with FIG. 3. FIG. 3 is a structural block diagram of an embodiment of a data processing system for a solid-state disk provided in the specific embodiment of the present disclosure. The data processing system is based on the Flash controller of the SSD. As shown in FIG. 3, in the embodiment, the data processing system 10 includes an operation detection module 101 configured to detect a user operations on a first storage area, which is visible to the operating system in the solid-state drive; a data synchronization module 102 configured to maintain the data of the first storage area and the data of a mirrored data storage area of a second storage area synchronization when the operation detection module detects that the operation is a reading or writing operation; and a storage module for deleted data 103 configured to keep the data of the first storage area and the data of a mirrored data storage area of a second storage area synchronization, and back up the deleted data from the first storage area to the deleted data storage area of the second storage area when the user operation is a deleting operation or a TRIM operation.

In some embodiments, the SSD data processing system 10 further includes a synchronization stopping module 104 configured to stop the data synchronization between the first storage area and the mirrored data storage area, and record the abnormal operation event when the operation detection module detects that the operation on the first storage area is an abnormal operation.

In some embodiments, the SSD data processing system 10 further includes an identifier adding module 105 configured to add an information identifier to the data, which is deleted from the first storage area.

In some embodiments, the SSD data processing system 10 further includes a visibility setting module 106 configured to verify a visible authentication command sent by the user, if and only if the verification is successful, set the second storage area, which is not visible to the operating system to be visible to the operating system, and enable the first type of operating function to the second storage area at the same time. The first type of operating functions includes restoring the data of the deleted data storage area to a storage medium and reading data of the second storage area.

In other embodiments, the SSD data processing system further includes a functional enable module 107 configured to verify the function enable authentication command sent by the user; if and only if the verification is successful, enable the second type of operation function of the second storage area corresponding to the function enable authentication command; and if the verification is failed, disable the operation corresponding to the function enable authentication command and return an error code. The second type of operating functions includes resetting the second storage area to be invisible to the operating system again; erasing the data in the second storage area; writing data to the second storage area; and reading the specific information from the second storage area.

In some embodiments, the SSD data processing system 10 further includes a volume detection module 108 configured to detect the storage volume of the second storage area. The storage module for deleted date 103 is also configured to process the newly deleted data according to the preset storage rule when the storage volume of the second storage area is detected to be less than or equal to a preset volume.

Building the first storage area and the second storage area in the SSD and both the first type of user and the second type of user can implement reading and writing access to the SSD through the host operating system. The first storage area is visible to the operating system, and the second storage area is invisible to the operating system by default. The first type of users cannot perform any operation on the second storage area through the operating system. The data management of the first storage area is carried out by the first type of users through the host operating system. Under the premise of operating system permission control, the first type of users can have full permission to read, write, delete, and format the data in the first storage area without verification. The second storage area is managed by the second type of users through the host operating system, and the second type of users verifies the system by sending authentication commands After system verification, the second type of users can operate on the second storage area. In this way, the method provided by the present disclosure can avoid the problem that the deleted data cannot be recovered caused by malicious Flash data or wrong operations, and use the Flash controller to realize data backup and recovery of the data in the SSD, thereby ensuring data security. In this embodiment, the first storage area, the mirror data storage area, and the deleted data storage area are physically separated Flash chips or different namespaces.

In summary, the data processing system provided in this embodiment synchronizes the data of the first storage area to the mirror data storage area of the second storage area when the user writes to the first storage area. When the user performs a delete or TRIM operation on the data in the first storage area, the Flash controller stores the deleted data from the first storage area to the deleted data storage area of the second storage area. And in the event of an abnormal operation, the data synchronization between the first storage area and the mirror data storage area is stopped. Only after the second type of users passes the verification can they operate on the second storage area, which is invisible to the operating system by default, thereby avoiding the problem that the deleted data cannot be recovered caused by malicious Flash data or wrong operations. A Flash controller is used to back up and restore the data in the SSD.

An embodiment of the present disclosure also provides a solid-state drive. FIG. 4 is a block diagram of an embodiment of a solid-state disk provided by an embodiment of the present disclosure. As shown in the FIG. 4, a solid-state drive 000 includes a first storage area 100, which is visible to the operating system; a second storage area 200, which is set to be invisible to the operating system. The second storage area 200 includes the mirrored data storage area 201 and the deleted data storage area 202. Their logical isolation can be realized by the algorithm of the SSD Flash controller, for example, through the flash transfer layer to achieve. The following program modules are executable by the Flash controller: an operation detection module configured to detect the user operations on the first storage area; a data synchronization module configured to keep the data of the first storage area and the data of the mirrored data storage area of the second storage area synchronized when the operation detection module detects that the operation is a reading or writing operation; and a storage module for deleted data configured to keep the data of the first storage area and the data of the mirrored data storage area of the second storage area synchronized, and back up the deleted data from the first storage area to the deleted data storage area of the second storage area when the operation detection module detects that the user operation is a deleting operation or a TRIM operation.

In this embodiment, the first storage area 100, the mirror data storage area 201 and the delete data storage area 202 are all logical areas, which can be physically separated particles of Flash chips or different namespaces. The first storage area 100 is visible to the operating system, and the first category of users (such as ordinary users) can manage the data of the first storage area 100 through the operating system, including the data reading, writing, deleting, or formatting. The second storage area 200 is managed by the authorized second category of users (such as an administrator) and is invisible to the operating system by default. The authorized second category of users can manage the data of the second storage area 200 through the operating system, can set the second storage area which is not visible to the operating system by default to be visible to the operating system, and can also set the second storage area, which is visible to the operating system, to be invisible to the operating system. The executing body of the data processing method of the solid-state disk provided by the embodiment of the present disclosure is the Flash controller of the solid-state disk.

In other embodiments, the SSD data processing system further includes a synchronization stopping module configured to stop the data synchronization between the first storage area and the mirrored data storage area, and then record the abnormal operation event when the operation detection module detects that the operation on the first storage area is an abnormal operation.

In other embodiments, the SSD data processing system further includes an identifier adding module configured to add an information identifier to the data which is deleted from the first storage area.

In other embodiments, the SSD data processing system further includes a visibility setting module configured to verify a visible authentication command that sent by the user; if and only if the verification is successful, set the second storage area, which is not visible to the operating system, to be visible to the operating system, and enable the first type of operating function for the second storage area at the same time. The first type of operating functions includes restoring the data of the deleted data storage area to a storage medium, and reading data of the second storage area.

In other embodiment, the SSD data processing system further includes a functional enable module configured to verify the function enable authentication command sent by the user; if and only if the verification is successful, enable the second type of operation function of the second storage area corresponding to the function enable authentication command; if the validation is failed, disable the operation corresponding to the function enable authentication command and return an error code. The second type of operating functions includes resetting the second storage area to be invisible to the operating system again; erasing the data in the second storage area; writing data to the second storage area; and reading the specific information from the second storage area.

In other embodiments, the SSD data processing system further includes a volume detection module configured to detect the storage volume of the second storage area. The storage module for deleted data is also configured to process the newly deleted data according to the preset storage rule when the storage volume of the second storage area is detected to be less than or equal to the preset volume.

In this embodiment, the Flash controller is used to perform some or all of the steps of the method disclosed herein. For ease of descriptions, the method disclosed herein is expressed as a series of steps. It is understood that the present disclosure is not limited by the specific sequence of the steps described above because some steps can be performed in other orders or simultaneously. It is also understood that some of the actions and modules described above may not be necessary for the present disclosure.

In the aforementioned embodiments, there are different emphases in the description of each embodiment. For parts not detailed in one embodiment, please refer to the relevant descriptions of other embodiments.

The method disclosed herein may be embodied in the form of a software product. The computer software product is stored in a Flash memory controller of an SSD and includes instructions for an SSD to perform all or part of the steps of the method described in each embodiment of the present disclosure.

The solid-state drive provided by the present disclosure includes the first storage area visible to the operating system and that can be operated by the first type of users, and the second storage area invisible to the operating system and that can be operated by the second type of users. The second storage area includes a mirrored data storage area used to synchronize the data in the first storage area, and a deleted data storage area used to store the deleted data in the first storage area. The solid-state drive provided by the embodiment of the present disclosure can avoid the problem that deleted data cannot be recovered caused by malicious Flash data or wrong operations. The Flash controller can be used to achieve data backing up and recovering in the SSD.

The technical principle of the present application has been described above with reference to embodiments. These descriptions are only for explaining the principle of the present application, and cannot be interpreted in any way as limiting the protection scope of the present application. The content shown by the drawings is only one of the embodiments of the present application, and the actual structure is not limited thereto. Based on the explanation herein, the person skilled in the art may associate other embodiments of the present application without creative effort, and all of these embodiments should be considered to fall into the protection scope of the present application.

What is claimed is:

1. A method for data processing in a solid-state drive comprising a first storage area and a second storage area, the second storage area comprising a mirrored data storage area for mirroring data stored in the first storage area and a deleted data storage area for storing data deleted from the first storage area, the first storage area being visible to an operating system and the second storage area being set to invisible to the operating system, the method comprising:
    detecting a user operation on the first storage area in the solid-state drive; and
    in response to the user operation being a deleting operation or a TRIM operation, keeping data of the first storage area and data of the mirrored data storage area of the second storage area synchronized by deleting data corresponding to the deleting operation or the TRIM operation from the first storage area and the mirrored data storage area of the second storage area, and backing up the data deleted from the first storage area to the deleted data storage area of the second storage area.

2. The method of claim 1, further comprising in response to the user operation being a reading operation or a writing operation, keeping the data of the first storage area and the data of the mirrored data storage area of the second storage area in the solid-state drive synchronized.

3. The method of claim 1, the method further comprising in response to the user operation being an abnormal operation that causes a data loss in the first storage area, stopping the data synchronization between the first storage area and the mirrored data storage area, and recording an event about the abnormal operation.

4. The method of claim 1, further comprising adding an information identifier to the data deleted from the first storage area.

5. The method of claim 1, further comprising processing the data deleted from the first storage area according to a preset storage rule when storage medium space of the second storage area is less than or equal to a preset volume.

6. The method of claim 1, further comprising:
    verifying a visible authentication command sent by a user of the solid-state drive;
    in response to the verification being successful, setting the second storage area to be visible to the operating system; and
    enabling a first type of operating function for the second storage area.

7. The method of claim 6, wherein the first type of operating functions comprises at least one of restoring, from the second storage area, the data deleted from the first storage area, or reading the data of the second storage area.

8. The method of claim 1, further comprising:
verifying a function enable authentication command sent by a user of the solid-state drive; and
in response to the verification being successful, enabling a second type of operation function for the second storage area corresponding to the function enable authentication command.

9. The method of claim 8, wherein the second type of operating functions comprises at least one of resetting the second storage area to be invisible to the operating system, erasing the data in the second storage area, writing data to the second storage area, or reading specific information of the second storage area.

10. The method of claim 9, further comprising in response to the verification being failed, disabling the second type of operation function corresponding to the function enable authentication command, and returning an error code.

11. A solid-state drive, comprising:
a first storage area visible to an operating system;
a second storage area set to be invisible to the operating system and comprising a mirrored data storage area for mirroring data stored in the first storage area and a deleted data storage area for storing data deleted from the first storage area; and
a Flash controller configured to:
detect a user operation on the first storage area; and
in response to the user operation being a deleting operation or a TRIM operation, keep data of the first storage area and data of the mirrored data storage area of the second storage area synchronized by deleting data corresponding to the deleting operation or the TRIM operation from the first storage area and the mirrored data storage area of the second storage area, and back up the deleted data to the deleted data storage area of the second storage area.

12. The solid-state drive of claim 11, wherein the Flash controller is further configured to in response to the user operation being a reading operation or a writing operation, keep the data of the first storage area and the data of the mirrored data storage area of the second storage area in the solid-state drive synchronized.

13. The solid-state drive of claim 11, wherein the Flash controller is further configured to in response to the user operation being an abnormal operation that causes a data loss in the first storage area, stop the data synchronization between the first storage area and the mirrored data storage area, and record an event about the abnormal operation.

14. The solid-state drive of claim 11, wherein the Flash controller is further configured to add an information identifier to the data deleted from the first storage area.

15. The solid-state drive of claim 11, wherein the Flash controller is further configured to process the data deleted from the first storage area according to a preset storage rule when a storage volume of the second storage area is less than or equal to a preset volume.

16. The solid-state drive of claim 11, wherein the Flash controller is further configured to:
verify a visible authentication command sent by a user of the solid-state drive;
in response to the verification being successful, set the second storage area to be visible to the operating system; and
enable a first type of operating function for the second storage area.

17. The solid-state drive of claim 16, wherein the first type of operating functions comprises at least one of restoring, from the second storage area, the data deleted from the first storage area, or reading the data of the second storage area.

18. The solid-state drive of claim 11, wherein the Flash controller is further configured to:
verify a function enable authentication command sent by a user of the solid-state drive; and
in response to the verification being successful, enable a second type of operation function for the second storage area corresponding to the function enable authentication command.

19. The solid-state drive of claim 18, wherein the second type of operating functions comprises at least one of resetting the second storage area to be invisible to the operating system, erasing the data in the second storage area, writing data to the second storage area, or reading specific information of the second storage area.

20. The solid-state drive of claim 19, wherein the Flash controller is further configured to in response to the verification being failed, disable the second type of operation function corresponding to the function enable authentication command, and return an error code.

* * * * *